Patented Oct. 12, 1948

2,451,313

UNITED STATES PATENT OFFICE 2,451,313

DEHYDRATED FRUIT PIE FILLING

Rhys W. Arengo-Jones, Toronto, Ontario, Canada, assignor to Thomas J. Lipton Limited, Toronto, Ontario, Canada, a company of Canada No Drawing. Application August 22, 1945, Serial No. 612,145. In Canada July 25, 1945

2 Claims. (Cl. 99—204)

My invention relates to new food products and to methods of making the same. More particularly it relates to dehydrated fruit pie filling and to a process for the manufacture thereof.

It is a principal object of my invention to provide a fruit pie filling in dehydrated form which may be added to a predetermined quantity of water and cooked immediately without the necessity of a rehydration period.

Another object of my invention is to provide a fruit pie filling in dehydrated form which will contain controlled amounts of added starch, sugar and other soluble and insoluble ingredients.

Another object of my invention is to provide a fruit pie filling in dehydrated form which will carry accurately controlled proportions of sulphur dioxide to preserve colour and flavour for a long period.

Still further objects and advantages of my invention will become apparent from the following description and will be pointed out with particularity in the claims appended to and forming a part of this specification.

Fruit pie filling consists essentially of fruit plus sugar and starch. The starch is used for absorbing the free moisture or juice from the cooked fruit and, in combination with said cooked fruit, forms a soft, gelatinous mass, the moisture of which will not be absorbed excessively by the pie crust or pastry and which will not collapse when the pie is cut.

Heretofore fruit pie fillings have been made by the pie maker cooking the prepared fruit with the required amounts of sugar and starch. Processed pie fillings have been prepared in the same manner and then subjected to heat sterilization in hermetically sealed containers or treated with a suitable preservative such as sodium benzoate.

The preparation of fruit pie fillings from dehydrated fruits has heretofore required the reconstitution and cooking of the dehydrated products together with the addition of starch, sugar and any required flavouring materials.

I have discovered that starch, sugar, flavouring materials and a suitable sulphite for preserving colour and flavour may be added to partially dehydrated fruit tissue to form an almost homogeneous mass that may be comminuted and dehydrated to a low moisture level with little or no loss in the characteristics and qualities of each ingredient. The finished product made in accordance with my invention has only to be added to a predetermined amount of water and cooked.

Preparation of dehydrated fruit with controlled added amounts of sugar and sulphur dioxide and having a low moisture content is described in detail in my copending application Serial No. 597,579, filed June 4, 1945, and assigned to the same assignee as the present application.

In the process that I have devised for the preparation of a dehydrated fruit pie filling the fruit is first put through the initial preparations of peeling, coring, trimming, sulphuring, segmenting and dehydrated or evaporated to the moisture content of 20% to 30% and the sulphur dioxide content of from 500 to 1500 parts per million that is customary in the dehydrated fruit products at present in commercial use. My process may, of course, be commenced from this point using as a base material such a commercially available dehydrated fruit product.

In accordance with my invention this base material is further reduced by chopping or grinding to small pieces and subjected to sufficient pressure to cause free moisture to come to the surface of said pieces. Starch, sugar, flavouring materials and a suitable sulphite are added at this stage and the material is then thoroughly mixed by grinding and chopping and is finally dehydrated or evaporated to a moisture content of less than 10%.

The quantities of sugar, starch, flavouring material and sulphite to be added in accordance with my invention may be predetermined for the type and quality of fruit used and the following typical formula is given, not by way of limitation, but as an indication of how my invention may be utilized in the manufacture of a dehydrated fruit pie filling:

| | |
|---|---|
| Partially dehydrated fruit (moisture content approximately 22%) lbs | 100 |
| Sugar lbs | 35 |
| Starch lbs | 12 |
| Fruit acid lbs | 1 |
| Potassium metabisulphite ozs | 1½ |

Preparation of material following this typical formula and manufactured in accordance with the process of my invention as previously described provides a fruit pie filling in dehydrated form which has stable characteristics with respect to colour and flavour without the necessity of packing in hermetically sealed containers and which may be used when required by simply adding to a predetermined quantity of water and cooking without necessity of a rehydration period.

It will be obvious to those skilled in the art that certain changes and modifications may be made without departing from my invention and I, therefore, aim in the appended claims to cover all such changes and modifications as fall within the true spirit and scope of my invention.

What I claim as new and desire to secure by Letters Patent of the United States is:

1. A method of producing a fruit pie filling which comprises subjecting normally dehydrated fruit to pressure to expose juice in the surface of the fruit pieces, adding to the mass predetermined proportions of sugar, starch and a sulphite preservative, grinding the mixture to dissolve the sugar and sulphite in the exposed juice, incorporate the solution in the tissue of each fruit piece and uniformly distribute the starch, and thereafter dehydrating the mass to reduce the moisture content to less than 10% and cause the solutes to crystallize within the mass of each fruit piece.

2. A method as defined in claim 1 wherein the proportion of sugar added is at least 35% of the weight of the dehydrated fruit.

R. W. ARENGO-JONES.

REFERENCES CITED

The following references are of record in the file of this patent:

UNITED STATES PATENTS

| Number | Name | Date |
|---|---|---|
| 1,259,634 | King | Mar. 19, 1918 |
| 1,374,160 | Fowler | Apr. 5, 1921 |
| 1,721,929 | Steinwand | July 23, 1929 |
| 1,944,265 | Pilorz | Jan. 23, 1934 |
| 2,137,634 | Hopkins | Nov. 22, 1938 |
| 2,192,041 | Headland | Feb. 27, 1940 |
| 2,358,086 | Mollner et al. | Sept. 12, 1944 |